(12) United States Patent
Engel et al.

(10) Patent No.: US 6,594,081 B2
(45) Date of Patent: Jul. 15, 2003

(54) ACTUATOR MECHANISM FOR TUNING AN OPTICAL DEVICE

(75) Inventors: Thomas W. Engel, Manchester, CT (US); James M. Sullivan, Manchester, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/752,332

(22) Filed: Dec. 29, 2000

(65) Prior Publication Data

US 2003/0090823 A1 May 15, 2003

(51) Int. Cl.⁷ .................. G02B 27/00; G02B 5/22; H01S 3/10
(52) U.S. Cl. .............. 359/578; 359/579; 359/892; 359/889; 385/37; 372/20
(58) Field of Search .............. 359/577, 578, 359/579, 892, 889, 173; 385/37; 73/593; 372/20

(56) References Cited

U.S. PATENT DOCUMENTS

| | | | |
|---|---|---|---|
| 3,190,108 A | 6/1965 | Ormond | 73/1 |
| 3,318,593 A | 5/1967 | Guernet | 269/60 |
| 3,849,857 A | 11/1974 | Murray, Jr. | 29/200 |
| 4,012,030 A | 3/1977 | Hesselgren | 269/60 |
| 4,193,317 A | 3/1980 | Oono et al. | 74/479 |
| 4,725,110 A | 2/1988 | Glenn et al. | 350/3.61 |
| 4,807,950 A | 2/1989 | Glenn et al. | 350/3.61 |
| 5,007,705 A | 4/1991 | Morey et al. | 350/96.29 |
| 5,042,898 A | 8/1991 | Morey et al. | 385/37 |
| 5,388,173 A | 2/1995 | Glenn | 385/37 |
| 5,469,520 A | 11/1995 | Morey et al. | 385/37 |
| 5,579,143 A | 11/1996 | Huber | 359/130 |
| 5,646,399 A | 7/1997 | Fukushima et al. | 250/226 |
| 5,691,999 A | 11/1997 | Ball et al. | 372/20 |
| 5,774,619 A | 6/1998 | Bruesselbach | 385/137 |
| 5,781,341 A | 7/1998 | Lee | 359/578 |
| 5,815,299 A | 9/1998 | Bayart et al. | 359/171 |
| 5,844,174 A | 12/1998 | Kuhlmann et al. | 177/50 |
| 5,995,255 A | 11/1999 | Giles | 359/124 |
| 5,999,671 A | 12/1999 | Jin et al. | 385/37 |
| 6,031,950 A | 2/2000 | Fujita | 385/14 |
| 6,229,827 B1 * | 5/2001 | Fernald et al. | 372/20 |
| 6,293,151 B1 * | 9/2001 | Kawamata et al. | 73/593 |

FOREIGN PATENT DOCUMENTS

| | | |
|---|---|---|
| EP | 0074152 | 3/1983 |
| EP | 1024391 | 8/2000 |
| WO | WO9530926 | 11/1995 |
| WO | WO0037969 | 6/2000 |
| WO | WO0039617 | 7/2000 |

* cited by examiner

Primary Examiner—Audrey Chang

(57) ABSTRACT

An actuator mechanism for a tunable optical filter unit that filters a selected wavelength band of the input light from a DWDM input light. The input light comprises a plurality of wavelength bands or optical channels of light, each of which are centered at a respective channel wavelength. The actuator mechanism exerts a substantially linear force to strain or stress a tunable optical filter element to a desire reflection wavelength(s). A controller, in accordance with a control algorithm, provides a drive signal to the actuator mechanism in response to a command signal and a feedback signal indicative of the center wavelength of the desired optical channel(s) to be filtered. The actuator mechanism includes a drive mechanism that translates linearly a slide in response to the drive signal. The linear slide includes a sloped engagement surface for engaging a flexure arm assembly that provides a substantially linear force in a direction of displacement, which is substantially perpendicular to the direction of translation of the slide, to the optical filter unit for tuning the Bragg grating of the optical filter element.

32 Claims, 4 Drawing Sheets

ACTUATOR MECHANISM FOR TUNING AN OPTICAL DEVICE

CROSS REFERENCE TO RELATED APPLICATIONS

Co-pending U.S. patent applications, Ser. No. 09/648,525, entitled "Optical Filter Having A Shaped Filter Function", fled Aug. 26, 2000; and co-pending U.S. patent applications, Ser. No. 09/648,524, entitled "Wide Range Tunable Optical Filter", filed contemporaneously; contain subject matter related to that disclosed herein, and which are incorporated herein by reference in their entirety.

TECHNICAL FIELD

The present invention relates to an actuator mechanism for a tunable optical device, and more particularly to an actuator mechanism for straining an optical waveguide having at least one reflective element, such as Bragg grating, to tune the Bragg grating to a desired reflection wavelength.

BACKGROUND ART

The telecommunication industry is turning towards optical networks to provide higher capacity (bandwidth) of data transfer for new applications. Consequently, the industry is continually developing technology to increase the bandwidth of the optical networks, which includes the technology of wavelength division multiplexing (WDM). A number of optical signals can be carried simultaneously on the optical fiber by modulating each signal on a different wavelength of light. The light propagating through a single optical fiber therefore includes a plurality of wavelength bands, referred to as channels, wherein each channel or wavelength band is centered at a reflection wavelength. The wavelength bands are sufficiently separated so that they do not overlap. Typically, networks that carry about eight channels or more are referred to as dense wavelength division multiplexing (DWDM) systems; such systems can carry greater than 200 channels.

The technology of optical networks is heading toward a more dynamic, flexible, and intelligent networking architecture to improve service delivery time. A key element of the emerging optical network is a tunable optical filter for selectively filtering a channel from the DWDM light propagating through the optical network. The tunable channel filter enables a channel to be dynamically switched, routed, monitored and conditioned.

It is known in the art of optical networks that Bragg gratings written in an optical fiber may be used to act as a tunable filter, as is described in U.S. Pat. No. 5,007,705, entitled "Variable Optical Fiber Bragg Filter Arrangement; U.S. Pat. No. 5,579,143, entitled "Optical System With Tunable In-Fiber Gratings", U.S. Pat. No. 5,815,299, entitled "Method and System for Equalizing Respective Power Levels of Channels of a Received Optical Frequency Division Multiplexed Signal"; and U.S. Pat. No. 5,995,255, entitled "Concatenated Fiber Grating Optical Monitor".

The tunable optical filters described in the aforementioned U.S. Pat. Nos. 5,007,705 and 5,579,143 tune a Bragg grating written in an optical fiber by stretching the fiber in the region of the Bragg grating using a number of different mechanical means. It is known to use a motorized actuator and mechanical arrangement to stretch the fiber. The optical filters require accurate and repeatable tuning of the Bragg grating to set its reflection wavelength within picometers of the desired wavelength. However, inherent in these mechanical arrangements are problems or unpredictable inaccuracies in the movement of the components of the actuator, such as stiction, wear, backlash, creep, slip and general looseness between the components. Consequently, it would be advantageous to provide an actuator mechanism for tuning an optical device that compensates or reduces the effects of the inherent problems of the mechanical arrangements to tune a Bragg grating.

SUMMARY OF THE INVENTION

An object of the present invention is to provide an actuator mechanism for tuning an optical device that reduces the effects of stiction, backlash, wear, inaccuracies and looseness of the actuator mechanism for tuning the optical device.

In accordance with an embodiment of the present invention, an actuation mechanism for tuning an optical filter comprises a slide for translating between a first and second position in a direction of translation. The slide has an engagement surface wherein the engagement surface is sloped relative to the direction of translation. A drive mechanism is coupled to the slide for translating the slide between the first and second position in response to a drive signal. A displacement arm has a first end and a second end, wherein one portion of the second end engages the engagement surface of the slide, and another portion of the second end engages the optical filter. The translation of the slide between the first and second position displaces another portion of the second end of the displacement arm in a direction of displacement to tune the optical filter.

In accordance with another embodiment of the present invention, a tunable optical filter comprises a tunable optical filter unit and an actuator mechanism. The optical filter receiving an optical input light comprising a plurality of optical channels. The optical filter includes an optical waveguide having at least one reflection element for reflecting at least one channel and passing the remaining channels. The actuator mechanism strains the optical waveguide to reflect the desired at least one channel. The actuator mechanism comprises a slide for translating between a first and second position in a direction of translation. The slide has an engagement surface wherein the engagement surface is sloped relative to the direction of translation. A drive mechanism is coupled to the slide for translating the slide between the first and second position in response to a drive signal. A displacement arm has a first end and a second end. One portion of the second end engages the engagement surface of the slide, and another portion of the second end engages the optical filter. The translation of the slide between the first and second position displaces another portion of the second end of the displacement arm in a direction of displacement to strain the optical waveguide.

BEST MODE FOR CARRYING OUT THE INVENTION

Figure 1:
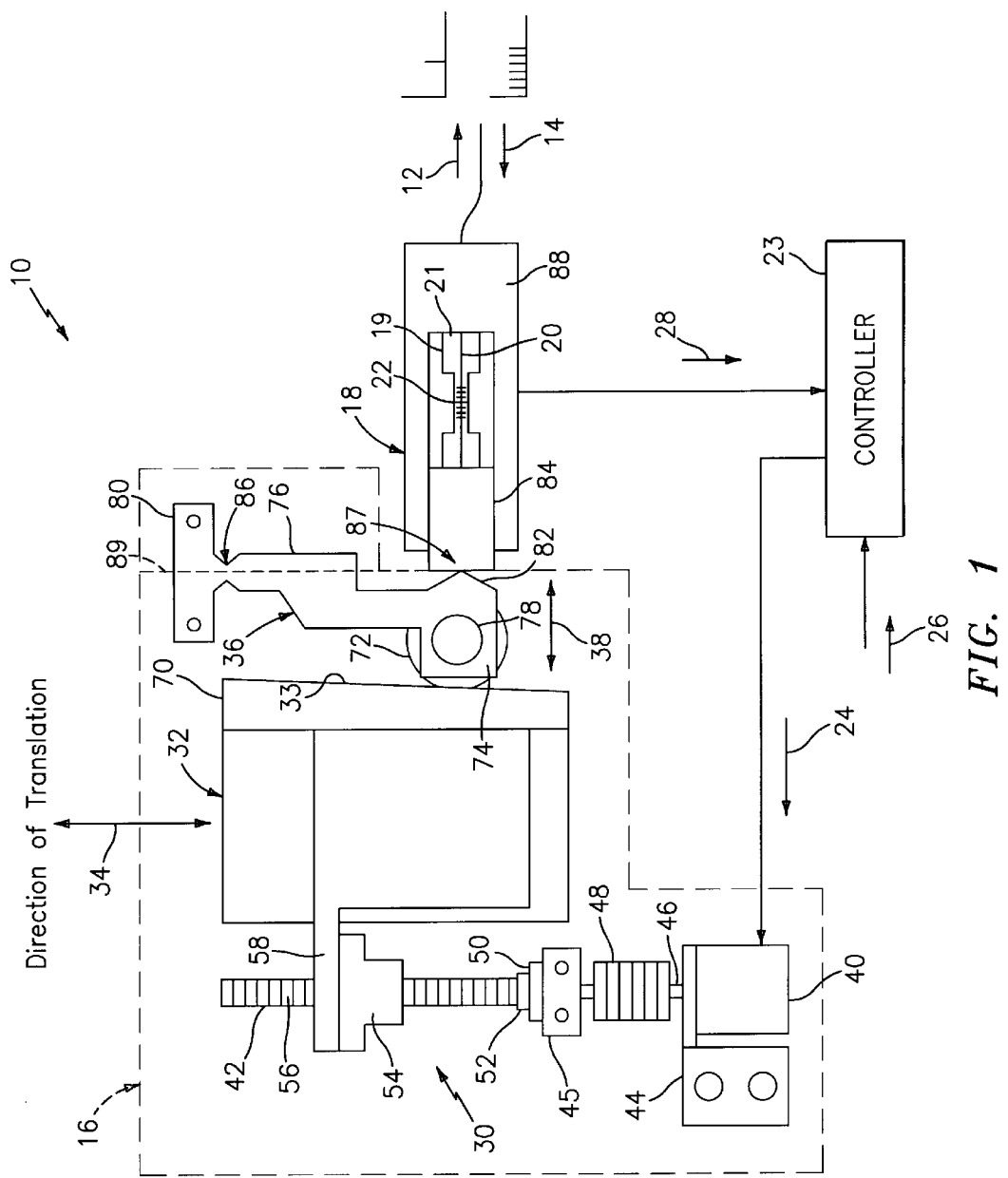
FIG. 1 is a graphical representation of a tunable optical filter having an actuator mechanism for tuning an optical filter unit, in accordance with the present invention.

Referring to FIG. 1, a tunable optical filter, generally shown as 10, filters a selected wavelength band(s) or optical channel(s) of the light 12 from a DWDM input light 14, which comprises a plurality of optical channels 14 of light, each of which are centered at a respective channel wavelength $\lambda_b$. The optical filter 10 includes an actuator mechanism 16 for exerting a substantially linear force to strain an optical filter unit 18, and tuning an optical filter element 19, as will be described in greater detail hereinafter. The optical filter element 19 comprises an optical waveguide having an inner core 20 disposed axially within an outer cladding 21 with at least one reflective element 22 (e.g., Bragg grating) written within the inner core. The Bragg grating(s) 22 has a reflection wavelength(s) that is the same as the center wavelength(s) of the channel(s) to be filtered. A controller 23, in accordance with a control algorithm, provides a drive signal 24 to the actuator mechanism 16 in response to a command signal 26 and a feedback signal 28 indicative of the center wavelength of the desired optical channel(s) to be filtered.

The actuator mechanism 16 includes a drive mechanism 30 that linearly translates a slide 32 in response to the drive signal 24 in a direction of translation as shown by arrows 34. A sloped engagement surface 33 of the linear slide 32 engages a flexure arm assembly 36 that provides a substantially linear force in a direction of displacement, as shown by arrows 38, which is substantially perpendicular to the direction of translation 34 of the slide to tune the optical filter unit of the tunable filter assembly.

The slope of the engagement surface 33 is substantially small, for example 0.015, such that a large translation of the linear slide provides a relatively small displacement of the flexure arm assembly. Consequently, the actuator mechanism 16, advantageously, deamplifies the movement of the lead screw and linear slide, and therefore a course motion, provided by the drive mechanism and the linear slide, is converted or deamplified to a fine movement. As a result, the effects of stiction, backlash, inaccuracies or looseness in the drive mechanism (e.g. looseness between the threads of the leadscrew and the drive nut or in the thrust bearing) are deamplified, and therefore have less effect on the tuning of the optical element to provide a more constant force or movement. Further, the deamplification of the movement of the drive mechanism and linear slide reduces the effects resulting from wear and subsequent looseness of the components. One skilled in the art will recognize that while the actuator mechanism reduces the effects of a loose mechanism, a stiff actuator mechanism in combination with the deamplification of the movement of the actuator mechanism provide an actuator mechanism that can be accurately and predictably actuated to a desired position or displacement.

Furthermore, the actuator mechanism is capable of providing a large displacement force in the direction of displacement 38 to compress or stretch the optical filter element 19 with relatively small torque (or translational force) provided by the drive mechanism. For example, a translational force of 2.2 lbs may provide approximately 150 lbs. of displacement force.

The tunable optical filter 10 may be used as part of any tunable optical devices, such as a reconfigurable optical add/drop module (ROADM), and a tunable laser, similar to that shown and described in U.S. patent application Ser. Nos. 09/707,084 and 10/173,972, which are herein incorporated by reference in their entirety. In addition, the optical filter 10 may be used as part of a tunable bandpass filter as shown and described in U.S. patent application Ser. Nos. 09/648,525 and 09/751,589, which are incorporated herein by reference in their entirety.

Figure 2:
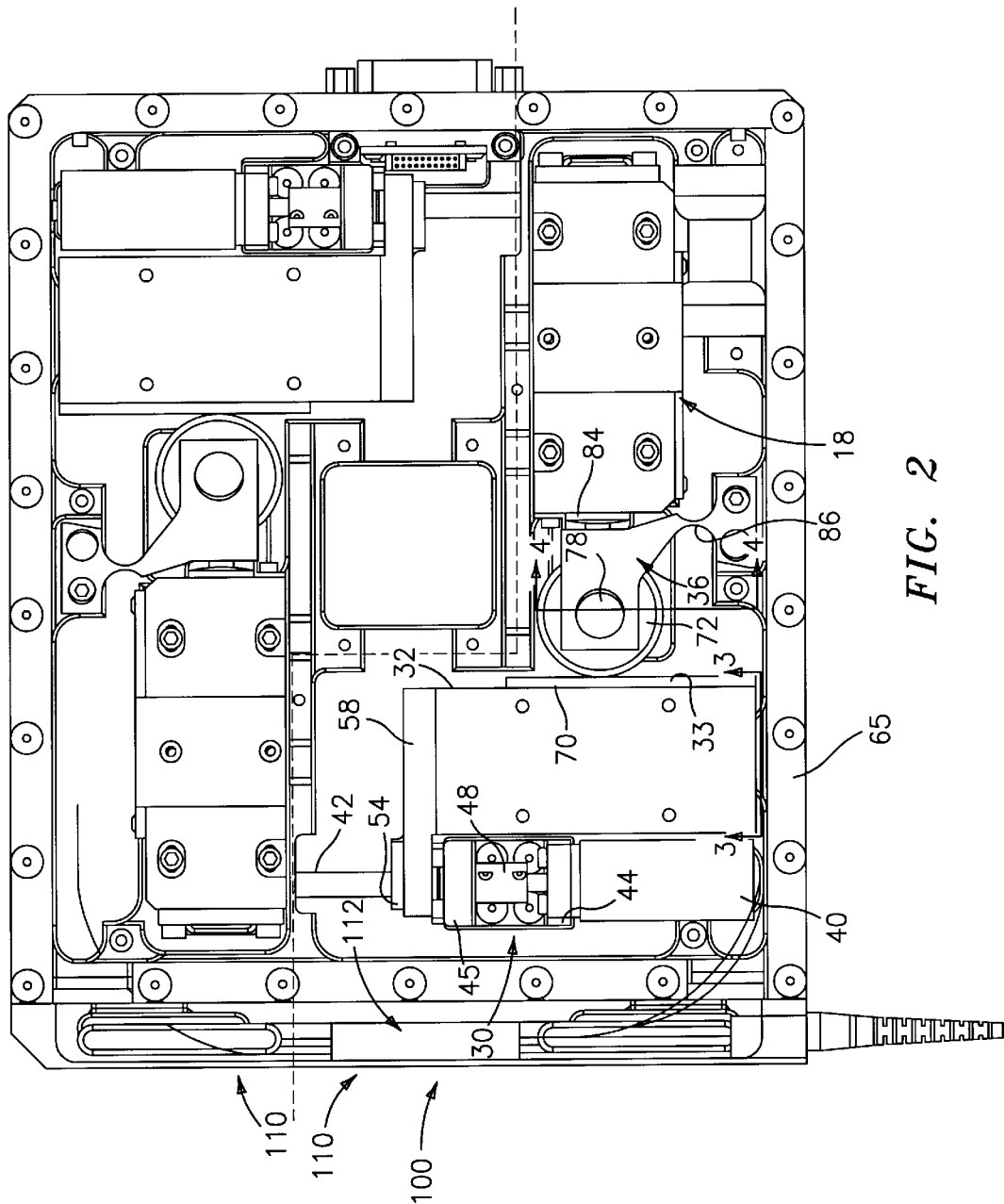
FIG. 2 is a top plan view of a tunable optical bandpass filter having an actuator mechanism similar to that depicted in FIG. 1, in accordance with another embodiment of the present invention.

FIG. 2 is illustrative of such a tunable bandpass filter 100, which is similar to that shown in U.S. patent application Ser. No. 09/751,589, entitled "Wide Range Tunable Optical Filter". The bandpass filter 100 includes a pair of tunable optical filter units 110 optically connected by a pair of circulators 112. It should be noted that components in FIG. 2 have the same reference numbers as similar components of FIG. 1.

Referring to FIGS. 1 and 2, the drive mechanism 30 includes a stepper motor 40 for driving a leadscrew 42 in a clockwise and counterclockwise direction in response to the drive signal 24. The stepper motor may be a high resolution stepper motor driven in a microstepping mode, such as that described in the aforementioned U.S. Pat. No. 5,469,520, "Compression Tuned Fiber Grating", to Morey et al, (e.g., a Melles Griot NANOMOVER), incorporated herein by reference. The stepper motor and lead screw are mounted to respective support brackets 44,45 to maintain a shaft 46 of the stepper motor and the leadscrew in axial alignment. The shaft 46 of the motor 40 and one end of the leadscrew 42 are coupled together by a flexible coupler 48. The coupler 48 is flexible to reduce the stresses and forces associated with the bearing (not shown) of the stepper motor 40 and thrust bearing 50 supporting the leadscrew 42. The leadscrew is rotatably supported and supported in axial thrust within the leadscrew support 45 by the thrust bearing 50, which engages the outer surface of a sleeve 52 mounted to the one end of the leadscrew 42. The thrust bearing 50 can be a single race design or alternatively a dual race design to provide axial rigidity as to increase the axial stiffness of the drive mechanism. One such dual race thrust bearing that may be used is manufactured by Barden Precision Bearings.

A drive nut 54 is threaded onto the threaded portion 56 of the leadscrew 42, which translates between the ends of the leadscrew as the stepper motor 40 rotates the leadscrew in the clockwise and counterclockwise direction. A slide arm 58 is attached to or integral with the drive nut 54. The threaded portion 56 may be coated with a polymeric material, such as polytetraflouride, known as Teflon®, to provide a surface having a low coefficient of friction for reducing the stiction between the drive nut 54 and threads of the leadscrew 42. The drive nut 54 has an inner diameter and thread dimensions to ensure the leadscrew 42 freely runs when mated with the drive nut. In one embodiment, the threaded portion 56 of the leadscrew 42 has a 3/16 thread that translates the drive nut 54 along the leadscrew approximately 0.048 inches per rotation of the leadscrew. The drive nut could also employ an anti-back lash mechanism to reduce play and increase the axial stiffness of the drive mechanism.

Figure 3:
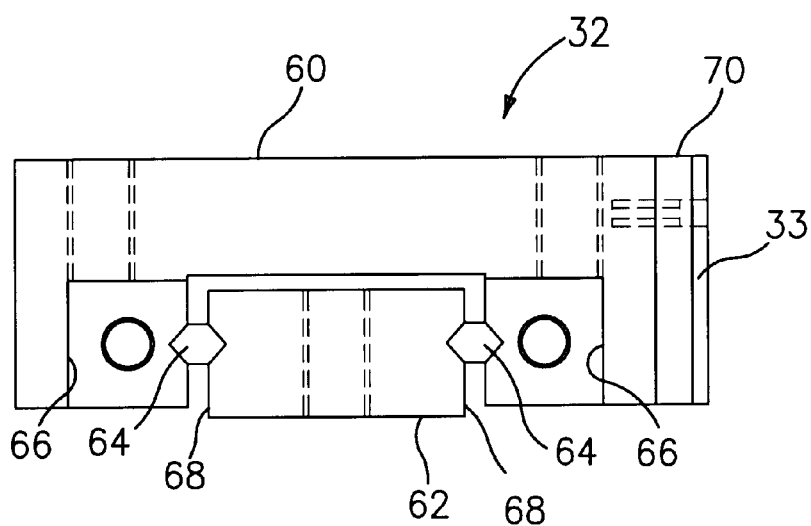
FIG. 3 is a side elevational view of a slide of the actuator mechanism of FIG. 2 taken along line 3—3, in accordance with the present invention.

The slide arm 58 is attached to or integral with the linear slide 32. One such linear slide that may be used is part no. ND 2-65.40 manufactured by Schneeberger Linear Technology. As shown in FIG. 3, the linear slide 32 comprises a carriage 60, a rail 62 and two sets of caged rollers 64. As best shown in FIGS. 1 and 2, the rail 62 is secured to the housing 65 substantially parallel to the axis of the leadscrew 42 in the direction of translation 34. The carriage 60 engages the rail 62 through two sets of caged rollers 64 set at opposite sides of the rail. These caged rollers roll between the carriage 60 and the rail 62 to provide free movement of the carriage as shown by arrow 34. A preload captures the rollers firmly between the carriage and the rail so that the slide is rigid in all directions other than direction 34. One will appreciate that only one set of caged rollers and may be disposed on one side of the rail 62 closest to the force exerted by the flexure arm assembly 36 onto the carriage 60.

Referring to FIGS. 1–3, a wedge 70 is mounted to one side of the linear slide 32 to provide the sloped engagement surface 33 for engaging the flexure arm assembly 36. The engagement surface 33 is sloped relative to the direction of translation 34 such that the sloped engagement surface displaces the flexure arm assembly 36 a predetermined distance in the direction of displacement 38. While the sloped engagement surface 33 is provided by the wedge 70, one will appreciate that the wedge or engagement surface may be integral with the linear slide 32. For example, the wedge 70 may be 2 inches in length having a slope of 0.015, such that for every inch of linear translation of the slide 32 along the direction of translation 34, the linear displacement 38 of the flexure arm assembly 36 is approximately 0.015 inches. The displacement of 0.015 inches tunes the optical filter element 19 over a spectral range of approximately 15,000 picometers (pm). One will appreciate that the tunable spectral range of the filter element is dependent on the range of translation of the slide, the slope of the engagement surface, and the geometry of the filter element.

Figure 4:
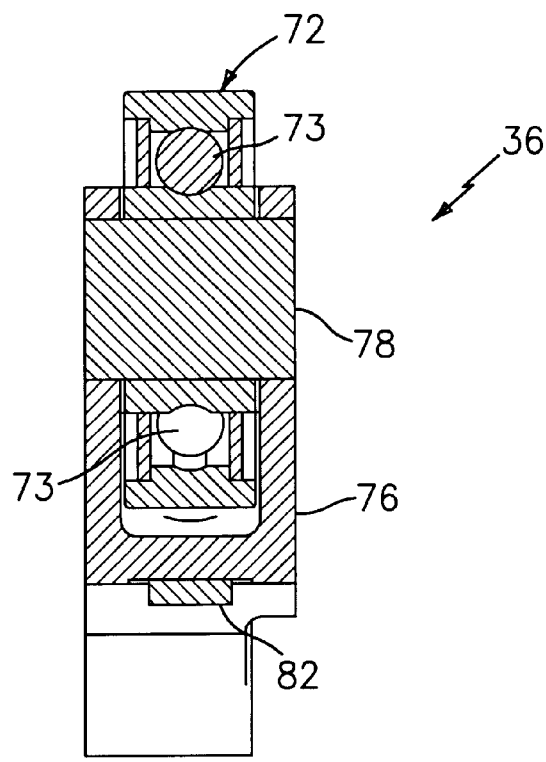
FIG. 4 is a cross-sectional view of a flexure arm of the actuator mechanism of FIG. 2 taken along line 4—4, in accordance with the present invention.

FIG. 4 is illustrative of a cross-sectional view of the flexure arm assembly 36 of FIG. 2. As shown in FIGS. 1, 2 and 4, the flexure arm assembly 36 comprises a roller or bearing 72 mounted to one end 74 of a flexure arm 76 by a bearing shaft pin 78. The one end 74 of the arm 76 forms a fork for receiving and supporting the bearing 72. The bearing 72 may be a ceramic hybrid bearing having, balls formed of ceramic material, to provide frictionless rotation of the bearing around the bearing shaft pin 78 and high load oscillatory operation at low speeds. An opposing end 80 of the flexure arm 76 is rigidly fixed to the housing 65 of the tunable optical filter 10. The bearing 72 is positioned to engage the sloped engagement surface 33 of the wedge 70. A pad 82 formed of a hardened material (e.g., carbide) is attached to a portion of the flexure arm 76 laterally opposing the bearing 72 for contacting a piston 84 of the optical filter unit 18 during the operation of the actuator mechanism 16. One such hybrid bearing 72 that might be used is part no. 6000-2RS 10×26×8 manufactured by Impact Bearing. The hybrid bearing includes ceramic balls disposed in steel races to reduce micro-welding in grease starved environment.

A portion of the flexure arm 76 adjacent to the fixed end 80 thereof is narrowed to provide a flexure hinge 86. The flexure hinge 86 may be aligned with the point of contact 87 of the pad of the flexure arm and the piston along the plane defined by line 87, which is perpendicular to the direction of force (i.e., direction of displacement 38) applied to a piston 84 of the optical filter unit 18 to reduce laterial forces applied to the piston. In other words, the arc motion of the pad disposed on the end of the flexure arm about pivot point 86 is substantially lateral in the direction of displacement 38 for small angular deflections. Consequently, the force applied to the piston by the flexure arm is primarily in the lateral direction as indicated by arrow 38. In another embodiment, the end 80 of the flexure arm 76 may be pivotally connected to the housing 65.

Referring to FIG. 1, the optical filter element 19 is maintained in axial alignment with the displacement 38 by the piston 84 within a housing 88. The piston engages the pad 82 of the flexure arm assembly 36, which provides a compressive force to the optical filter element 19 to tune the reflection wavelength(s) of the Bragg grating(s) 22 written in the inner core of the tunable optical element 19.

In the operation of the actuator mechanism 16, the stepper motor 40 rotates the shaft 46 a predetermined number of turns in response to the drive signal 24 generated by the controller 23. As the leadscrew 42 turns correspondingly to the rotation of the shaft 46 of the stepper motor 40, the drive nut 54 and slide arm 58 translate up or down along the length of the leadscrew. Correspondingly, the linear slide 32 translates up or down along the rail 62 in the direction of translation 34 to displace the flexure arm assembly 36 in the direction of displacement 38 to compress the optical filter element 19, which tunes the Bragg grating 22.

For example, as the linear slide 32 translates downward (as shown in FIG. 1), the bearing 72 rolls along the engagement surface 33 of the wedge 70 and forces the pad 82 on the flexure arm 76 substantially laterally, along the direction of displacement 38, to laterally move the piston 84 of the tunable optical unit 18 to compress the filter element 19. Conversely, as the linear slide 32 translates upward, the bearing 72 rolls along the engagement surface 33 of the wedge 70, and thus relieves the force applied by the pad 82 to the piston 84 of the tunable optical filter unit 18, which relieves the compressive force of the optical filter element 19. While the engagement surface is shown sloping in one direction, one will appreciate that the engagement surface may slope in the other direction, such that movement of the slide downward decreases the force applied to the piston of the filter module and moving the slide upward increases the applied force to the piston.

Figure 5:
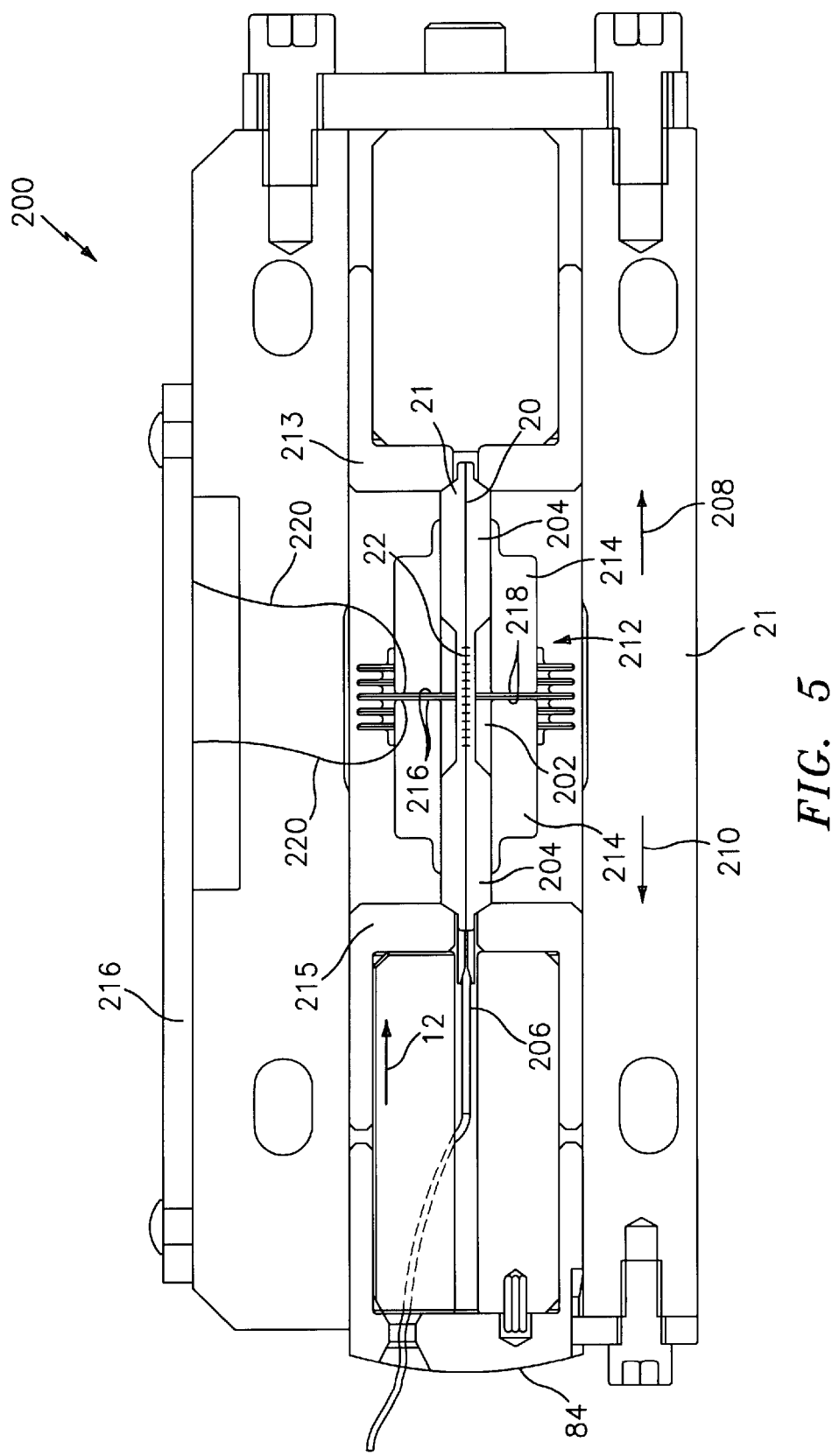
FIG. 5 is a top cross-sectional view of an optical filter unit of FIG. 2, in accordance with the present invention.

FIG. 5 is illustrative of an embodiment of a compression-tuned optical filter unit 200 for tuning the Bragg grating(s) 22 of the optical filter element 19. The optical filter 200 shown in FIG. 5 is similar to the tunable optical filters shown and described in co-pending U.S. patent applications Ser. No. 09/648,525, entitled "Optical Filter Having A Shaped Filter Function"; Ser. No. 09/751,589, entitled "Wide Range Tunable Optical Filter"; and Ser. No. 09/707,084, now abandoned, entitled "Compression-Tuned Optical Waveguide", which are incorporated herein by reference in their entirety. The components of FIG. 5 that are similar to those shown in the prior Figures will have the same reference number.

The optical filter element 19 provided in the compression-tuned filter unit 200 may be a bulk or large diameter optical waveguide, having an outer cladding 21 and an inner core 20. The filter element 19 has an outer diameter of at least 0.3 mm and comprises silica glass ($SiO_2$) having the appropriate dopants, as is known, to allow light 12 to propagate along the inner core 20. The filter element 19 may be formed by using fiber drawing techniques now know or later developed that provide the resultant desired dimensions for the core and the outer dimensions discussed hereinbefore, similar to that disclosed in co-pending U.S. patent application, Ser. No. 09/455,868 entitled "Large Diameter Optical Waveguide, Grating, and Laser". The filter element 19 may then be etched, grounded or machined to form a "dogbone" shape having a narrow central section 202 and larger outer sections 204. Advantageously, the dogbone shape provides increased strain sensitivity in converting force or displacement applied by the actuator mechanism 16 to wavelength shift of the Bragg grating 22 to assure accurate tuning of the grating. A fiber or "pigtail" 206 may be attached to the end(s) of the filter element(s) 19 by known techniques, such as epoxy or glass fusion.

Alternatively, the optical filter element 19 may be formed by heating, collapsing and fusing a glass capillary tube to a fiber (not shown) by a laser, filament, flame, etc., as is described in copending U.S. patent application, Ser. No. 09/455,865, entitled "Tube-Encased Fiber Grating", which is incorporated herein by reference.

As described hereinbefore, a Bragg grating 22 is written (embedded or imprinted) into the inner core 20 of the filter element 19. The Bragg grating 22 reflects a portion of the light 12 as indicated by a line 208 having a predetermined wavelength band of light centered at a reflection wavelength $\lambda_b$, and passes the remaining wavelengths of the incident light 12 (within a predetermined wavelength range), as indicated by a line 210. The Bragg grating 22, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming A Periodic Gratings in Optical Fibers", to Glenn, which are hereby incorporated by reference to the extent necessary to understand the present invention.

However, any wavelength-tunable grating or reflective element 22 embedded, written, etched, imprinted, or otherwise formed in the inner core 20 may be used if desired. As used herein, the term "grating" means any of such reflective elements. Further, the reflective element (or grating) 22 may be used in reflection and/or transmission of light.

The filter element 20 is axially compressed by a compression device or housing 211. One end of the filter element 19 is pressed against a seat 213 in one end of the housing 211. The housing guides the piston 84 that includes a seat 215 that presses against the other end of the filter element 19. The piston 84 has a slot 217 through it to allow the pigtail 206 to pass therethrough.

The optical filter unit 200 may be assembled such that a pre-strain or no pre-stain exists on the filter element 19 prior to applying any outside forces.

In one embodiment, a displacement sensor 212 provides feedback of the reflection wavelength of the filter element 19. The sensor 212 includes a pair of capacitive elements 214 and a displacement sensor circuit 216, similar to that disclosed in co-pending U.S. patent application, Ser. No. 09/519,802 entitled, "Tunable Optical Structure Featuring Feedback Control", filed Mar. 6, 2000, which is incorporated by reference in its entirety. Each capacitive element 214 is generally tubular, each of which provides a capacitive surface 216. The capacitive elements 214 are mounted to respective ends of the filter element 19 such that the capacitive surfaces 216 are spaced a predetermined distance apart, for example, approximately 1–2 microns. The capacitive elements 214 may be bonded or secured using an epoxy or other adhesive compound, or fused to filter element 19 using a $CO_2$ laser or other heating element. The capacitive surfaces 216 are coated with a metallic coating, such as gold, to form a pair of annular capacitive plates 218. The change in capacitance depends on the change in the spacing between the capacitive plates.

Electrodes 220 are attached to the capacitive plates 218 to connect the capacitor to the displacement sensor circuit 216. The sensor circuit 216 measures the capacitance between the capacitive plates 218; and provides a sensed signal 28 (see FIG. 1), indicative of the measured capacitance, to the controller 23. As the filter element 19 is strained, the gap between the parallel capacitive plates 218 will vary, thereby causing the capacitance to change correspondingly. Specifically, as the grating 22 is compressed, the gap between the capacitive plates 218 is reduced, resulting in an increase in capacitance. The change in capacitance is inversely proportional to the change in the reflection wavelength $\lambda_B$ of the grating 22. Since the capacitive elements 214 are directly connected to the filter element 19, the capacitive elements are passive and will not slip.

While the drive mechanism 30 was described hereinbefore as including a stepper motor 40 and leadscrew 42, one will recognize and appreciate that any drive mechanism to translate the slide may be used. Other such drive mechanisms may comprise a piezoelectric (PZT) actuator, a DC brush motor and/or a brushless motor.

While the actuator mechanism 16 described hereinbefore as a means for tuning compression-tuned optical devices, one will appreciate that the actuator mechanism may be used to tune a tension-based optical device, such as an optical filter as described in U.S. Pat. No. 5,007,705, entitled "Variable Optical Fiber Bragg Filter Arrangement; U.S. Pat. No. 5,579,143, entitled "Optical System With Tunable In-Fiber Gratings", U.S. Pat. No. 5,815,299, entitled "Method and System for Equalizing Respective Power Levels of Channels of a Received Optical Frequency Division Multiplexed Signal"; and U.S. Pat. No. 5,995,255, entitled "Concatenated Fiber Grating Optical Monitor", which are herein incorporated by reference in their entirety.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. An actuation mechanism for tuning an optical filter unit comprising:
    a slide that translates between a first and second position in a direction of translation, the slide having an engagement surface wherein the engagement surface is sloped relative to the direction of translation;
    a drive mechanism coupled to the slide that translates the slide between the first and second position in response to a drive signal; and
    a displacement arm having a first end and a second end, the first end engaging the engagement surface of the slide and of the second end engaging the optical filter unit, whereby translation of the slide between the first and second position displaces the second end of the displacement arm in a direction of displacement to tune the optical filter unit.

2. The actuation mechanism of claim 1, wherein the slide includes a wedge mounted to a platform, the wedge having the engagement surface.

3. The actuation mechanism of claim 1, wherein the drive mechanism comprises a leadscrew coupled to a motor for driving the slide in the direction of translation.

4. The actuation mechanism of claim 3, wherein the leadscrew is coated with a polymeric material.

5. The actuation mechanism of claim 1, further comprising a controller for providing the drive signal in response to a command signal representative of the desired displacement of the second end of the displacement arm.

6. The actuation mechanism of claim 1, wherein the displacement arm further includes a third end that is flexible to permit movement of the second end of the displacement arm relative to the third end.

7. The actuation mechanism of claim 6, wherein the third end of the displacement arm is pivotally mounted.

8. The actuation mechanism of claim 1, wherein the displacement arm includes a flexure hinge.

9. The actuation mechanism of claim 8, wherein the hinge is disposed along a linear line that is substantially perpendicular to the direction of displacement.

10. The actuation mechanism of claim 1, wherein the displacement arm includes a bearing mounted to the first end of the displacement arm for engaging the engagement surface of the slide.

11. The actuation mechanism of claim 1, wherein the displacement arm includes a pad mounted to the second end of the displacement arm for contacting the optical filter unit.

12. The actuation mechanism of claim 1, wherein the slope of the engagement surface is substantially small.

13. The actuation mechanism of claim 1, wherein the slope of the engagement surface is approximately 0.015.

14. A tunable optical filter comprising:
   a tunable optical filter unit that receives an optical input light comprising a plurality of optical wavelength bands, the optical filter including an optical waveguide having at least one reflection element that reflects at least one wavelength band and passing the remaining wavelength bands; and
   an actuator mechanism that strains the optical waveguide to reflect the desired at least one wavelength band; the actuator mechanism comprising:
     a slide that translates between a first and second position in a direction of translation, the slide having an engagement surface wherein the engagement surface is sloped relative to the direction of translation;
     a drive mechanism coupled to the slide that translates the slide between the first and second position in response to a drive signal; and
     a displacement arm having a first end and a second end, the first end engaging the engagement surface of the slide and of the second end engaging the optical filter unit, whereby translation of the slide between the first and second position displaces the second end of the displacement arm in a direction of displacement to strain the optical waveguide.

15. The optical filter of claim 14, wherein the tunable optical filter unit is a compression-tuned.

16. The optical filter of claim 14, wherein the tunable optical filter unit is tension-tuned.

17. The optical filter of claim 14, wherein the optical waveguide is an optical fiber.

18. The optical filter of claim 14, wherein the optical waveguide is a bulk waveguide.

19. The optical filter of claim 14, wherein drive mechanism comprises a leadscrew coupled to a motor for driving the slide in the direction of translation.

20. The optical filter of claim 19, wherein the leadscrew is coated with a polymeric material.

21. The optical filter of claim 14, further comprising a controller for providing the drive signal in response to a command signal representative of the desired displacement of the displacement arm.

22. The optical filter of claim 14, wherein the displacement arm further includes a third end that is flexible to permit movement of the second end of the displacement arm relative to the third end.

23. The optical filter of claim 14, wherein the displacement arm includes a bearing mounted to the first end of the displacement arm for engaging the engagement surface of the slide.

24. The optical filter of claim 14, wherein the slide includes a wedge to a platform, the wedge having the engagement surface.

25. The optical filter of claim 14, wherein the displacement arm includes a flexure hinge.

26. The optical filter of claim 25, wherein the hinge is disposed along a linear line that is substantially perpendicular to the direction of displacement.

27. The optical filter of claim 14, wherein the third end of the displacement arm is pivotally mounted.

28. The optical filter of claim 14, wherein the slope of the engagement surface is substantially small.

29. The optical filter of claim 14, wherein the slope of the engagement surface is approximately 0.015.

30. The optical filter of claim 14, wherein the optical filter unit includes a piston that strains the optical waveguide in response to the movement of the displacement arm.

31. The optical filter of claim 14, wherein the optical waveguide comprises:
   an optical fiber, having a reflective element written therein; and
   a tube, having the optical fiber and the reflective element encased therein along a longitudinal axis of the tube, the tube being fused to at least a portion of the fiber.

32. The optical filter of claim 14, wherein the optical waveguide having an outer transverse dimension of at least 0.3 mm.

* * * * *